July 25, 1933.  H. WALTER  1,919,284
APPARATUS FOR MEASURING ALTERNATING CURRENT
Filed Sept. 8, 1930
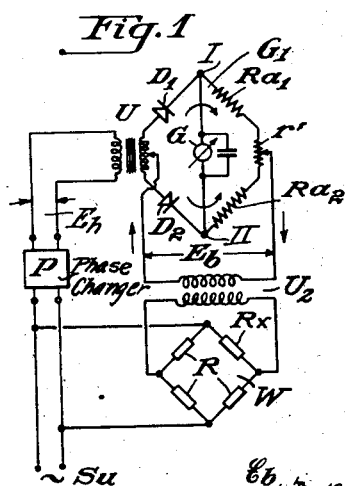
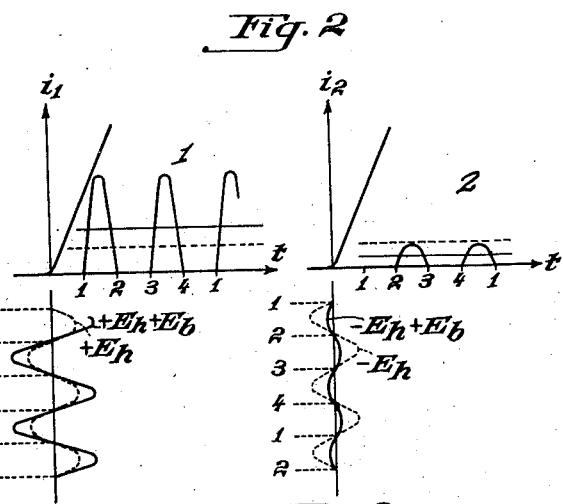
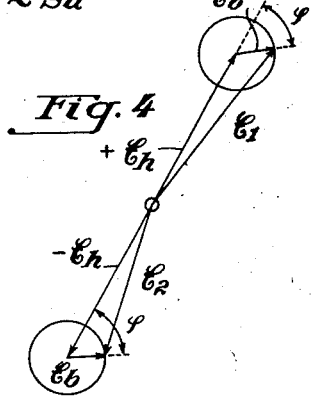
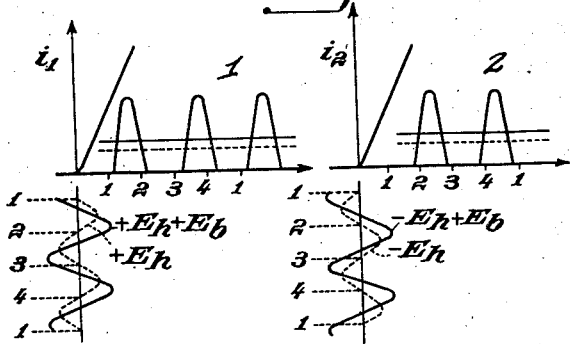
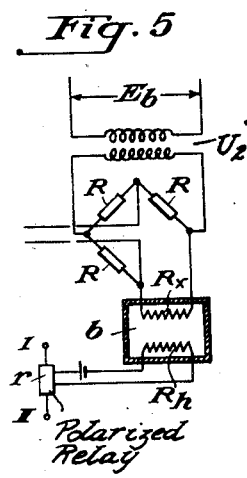
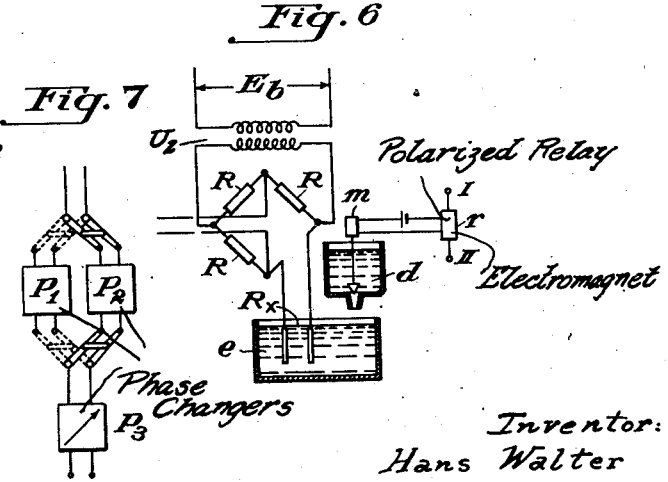
Inventor:
Hans Walter
by
Attorneys Patented July 25, 1933

1,919,284

UNITED STATES PATENT OFFICE

HANS WALTER, OF BERLIN-CHARLOTTENBURG, GERMANY, ASSIGNOR TO SIEMENS & HALSKE, AKTIENGESELLSCHAFT, OF SIEMENSSTADT NEAR BERLIN, GERMANY, A CORPORATION OF GERMANY

APPARATUS FOR MEASURING ALTERNATING CURRENT

Application filed September 8, 1930, Serial No. 480,443, and in Germany September 11, 1929.

My invention relates to improvements in apparatus for measuring alternating current.

In alternating current measurements, more particularly in the communication art, the telephone is frequently used as indicating apparatus in comparison as well as in zero methods. It is well known, however, that the use of the telephone involves various drawbacks and numerous attempts have therefore been made to replace it by pointer instruments, preferably in conjunction with amplifiers and rectifiers. All the known methods have the disadvantage that they indicate the amount of the measured current only. In a bridge measurement, for instance, it is thus impossible to ascertain in which sense the bridge balance is disturbed. This is particularly difficult if measurements of complex impedances with approximately equal components, i. e. equal value of ohmic and capacitive inductive components respectively of the impedance, have to be made.

The object of my present invention is to provide a rectifier arrangement for alternating current measurements which eliminates all the above recited drawbacks.

According to my invention the rectifier arrangement for alternating current measurements and the like consists substantially of a bridge at least two arms of which contain rectifiers, which have the property of dry rectifiers, viz. are operative with a characteristic the curved portion of which is negligibly small in comparison with the straight portion. The rectifiers of this bridge are fed with an auxiliary voltage and the voltage to be measured is small in comparison with said auxiliary voltage. The auxiliary voltage is chosen so large that the range of the characteristic or curve swept by the auxiliary voltage may be considered as a straight line so that the direct voltage supplied by the rectifier arrangement is within wide limits, independent of the amplitude of the auxiliary voltage.

Preferably the auxiliary voltage is derived from the same source of current as that to be measured or a source synchronous with it.

For instance the voltage supplied to a measuring arrangement may be the voltage which is to be examined or measured.

Some embodiments of my invention are illustrated as examples in the drawing accompanying my specification. In the drawing, Fig. 1 is a diagrammatic illustration of an embodiment of my invention comprising in combination a rectifier arrangement with an alternating current measuring bridge, said combination being particularly suitable for explaining the mode of operation;

Fig. 2 illustrates graphs of the voltage and current of both branches of the rectifying bridge shown in Fig. 1 for a phase angle of 0° between the voltage impressed upon the bridge by the source of electricity and the voltage to be measured;

Fig. 3 is similar to Fig. 2 except that the phase angle between the voltage of the source of electricity and the voltage to be measured is 90°;

Fig. 4 is a vector diagram of the auxiliary voltage and the voltage to be measured of both branches of the rectifier bridge when the phase angle between these voltages is $\phi$;

Fig. 5 is a diagrammatic illustration of a temperature regulating device for an electric heating oven or the like which can be used in conjunction with the arrangement shown in Fig. 1;

Fig. 6 is an arrangement for maintaining a constant concentration of a solution in an electrolytic bath and which may be used in conjunction with the arrangement shown in Fig. 1; and Fig. 7 is a modified embodiment of the phase shifter P shown in Fig. 1 for varying the phase angle between the auxiliary voltage impressed upon the rectifier bridge and the voltage to be measured.

In Fig. 1, branch 1 of the rectifier bridge G—1 is formed by the rectifier $D_1$ and the resistance $Ra_1$, while branch 2 is formed by the rectifier $D_2$ and the resistance $Ra_2$. If the resistances $Ra_1$ and $Ra_2$ are invariable, the balance of the bridge arrangement can be brought about by the resistance $r'$. An auxiliary voltage $E_h$ may be induced in each of the two rectifier branches in a suitable manner. For instance, in Fig. 1 a transformer U is shown the primary of which is energized with electricity from $Su$. The secondary of transformer U is divided into two equal halves so that substantially the same voltage is impressed on branches 1 and 2. The amplitude of the voltage is equal in each branch but the phases are directly opposed to each other. Between the source of current $Su$ and the primary of the transformer U, Fig. 1 indicates at P a phase changer, for instance a network, for changing the phase angle between the auxiliary voltage $E_h$ and the voltage $E_b$ to be measured. Assuming that a voltage to be measured exists, for instance, in consequence of an unbalanced alternating current bridge W, and that the said voltage applied, for example, by a transformer $U_2$ is $E_b$. In the branch 1 of the rectifier bridge thus acts the voltage (1)  $E_1 = E_b + E_h$ In the branch 2 acts the voltage (2)  $E_2 = E_b - E_h$ For the direct voltages acting at the resistance $Ra_1$ and $Ra_2$ the following proportionalities hold good $$C \quad e_1 \alpha / f_1 / = E_1$$
$$C \quad e_2 \alpha / f_2 / = E_2$$

For the deflection of the direct current instrument then is $$a \alpha (E_1 - E_2)$$

From this and from Fig. 2, it will be understood that for $\varphi = 0$ the deflecton of the indicating instrument is proportonal to the indicator voltage $E_b$ of the measuring bridge according to magnitude and sign. For $\varphi = 90$, however, the deflection is independent of the voltage $E_b$. This holds good with the greater accuracy the greater $E_h$ is chosen in comparison with $E_b$. The choice of a high auxiliary voltage $E_h$ has, furthermore, the advantage that thereby the rectifiers $D_1$ and $D_2$ may be operated in the straight portion of their characteristic curves, in such a manner that in spite of the fluctuations of $E_b$ the working point remains in the straight portion of the characteristic.

Assuming now that the alternating current measuring bridge W with the resistances R, R, R and $R_x$ has been thrown out of balance by increasing the resistance $R_x$ and that in the diagonal a voltage $E_b$ is generated which may be in phase with $E_h$. As Fig. 2 shows, with reference to an idealized rectifier characteristic, i. e. a characteristic the curved portion of which is small as compared with the straight portion, the appearance of $E_b$ causes an increase of the direct current component in branch 1 and a decrease in branch 2 of the direct current or rectifier bridge G—1 (see Fig. 1). A direct current instrument G connected in the diagonal then has a positive deflection. If, on the other hand, the bridge is thrown out of balance by a decrease of $R_x$, $E_b$ reverses its phase and the direct current component in the branch 2 increases while that in the branch 1 decreases. The galvanometer G then has a negative deflection.

In alternating current measurements the voltage $E_b$ to be measured will generally consist of two components displaced in phase 90°, and corresponding to the real and the imaginary portion of the impedance to be measured. Fig. 3 of the drawing demonstrates the influence which the phase displacement between auxiliary voltage $E_h$ and the voltage $E_b$ to be measured involves. In the case illustrated, a phase displacement between $E_h$ and $E_b$ of 90° is assumed, by way of example. It will be observed that in both branches 1 and 2, the direct current components are affected in the same way by the variation of the voltage $E_b$ to be measured so that the deflection of the galvanometer remains unchanged.

By a suitable phase shifting of the auxiliary voltage, according to another feature of my invention it is possible to determine selectively the real or the imaginary component of the impedance, i. e. the ohmic or capacitive inductive component respectively of the impedance, to be measured independently of each other. For this purpose it is sometimes sufficient to provide two fixed phase positions displaced in relation to one another by an angle of 90°.

Fig. 7 shows the device represented in Fig. 1 at P for shifting the phase position between the voltage to be measured and the auxiliary voltage in the case of two phase positions shifted by an angle of 90° and capable of being changed over. $P_1$ is a system of connection which turns the phases through an angle of 90°. $P_2$ transmits without phase shifting but introduces the same attenuation as $P_1$.

With $P_3$ the phase may be balanced with regard to inductive elements in the alternating current bridge. In the case of ohmic resistances in the alternating current bridge, $P_3$ may be adjusted to zero or be omitted altogether. In the case of phase shifters which possess no excessively large attenuation, $P_2$ may be replaced by a straight through-connection inasmuch as comparatively large changes in the auxiliary voltage do not affect the result of the measurements so that the introduction of even a large attenuation, during the changing over from $P_2$ to $P_1$ is harmless.

Fig. 4 shows a vector diagram of the rectifier bridge G—1. The phase difference between the voltage to be measured $E_b$ and the auxiliary voltage $E_h$ is denoted by the letter $\varphi$ and the vector of the voltage to be measured is denoted by the reference character $C_b$ and the vector of the auxiliary voltage by $C_h$.

The voltages produced in branches 1 and 2 of the rectifier bridge G—1 by the rectification are as follows:—

$$C_1 = C_h + C_b$$
$$C_2 = C_h - C_b$$

For a deflection $\alpha$ of the indicating instrument G, the following relation exists:

$$\alpha = (C_1 - C_2) = (C_h + C_b) - (C_h - C_b)$$

In other words the deflection $\alpha$ is equal to the difference between vectors $C_1 - C_2$ which in turn is equal to the sum of the vectors $C_h$ and $C_b$ minus the difference of vectors $C_h - C_b$. As may be seen from Fig. 4, by making the vector of the auxiliary voltage very large relatively to the vector of the voltage to be measured, the value of the vectors is as follows:—

$$E_1 = E_h + E_b \cos \varphi$$
$$E_2 = E_h - E_b \cos \varphi$$

This equation gives the following for the deflection of the galvanometer. $\alpha$ corresponds to $(E_1 - E_2) = 2E_b \cos \varphi$.

If the phase angle $\varphi$ between the auxiliary voltage $E_h$ and the voltage to be measured $E_b$ is zero, then the deflection of the galvanometer is proportional to the voltage to be measured. If the angle $\varphi$ is 90°, then there will be no deflection of the galvanometer.

Instead of the transformers U or $U_2$ (see Fig. 1) or repeaters which apply the auxiliary voltage and the voltage to be measured, ohmic resistances or other coupling members may be provided. The rectifier bridge is operative in the manner described hereinabove, if the auxiliary voltage and the voltage to be measured are interchanged. On the other hand, it is of fundamental importance for my invention that the auxiliary voltage itself is high compared with the voltage to be measured and the rectifiers employed are operative with a characteristic, the curved portion of which is negligibly small in comparison with the straight portion in the manner of the characteristic shown in Figs. 2 and 3. Such properties are an inherent feature of dry rectifiers, in particular, which beyond that, have the further advantage over rectifier tubes of the independence of voltage fluctuations of the auxiliary batteries.

Under these conditions, the direct current generated or the deflection of the indicating instrument is a linear function of the voltage to be measured and may be represented by the equation:

$$\alpha = kE_b \cos \varphi$$

wherein $E_b$ is the applied voltage to be measured, $\varphi$ the angle between said voltage and the auxiliary voltage and $k$ a value which is a constant even when the auxiliary voltage is changed by a multiple. In contrast to the foregoing, there is in known arrangements, which work with quadratic characteristics, such as vacuum bulb rectifiers, the deflection of the instrument which is proportional to the auxiliary voltage $E_h$ according to the equation $$\alpha = kE_h E_b \cos \varphi$$

For the practical use of the rectifier arrangement, it may be of particular advantage to provide a relay or the like in place of the direct current instrument. In a combination of the rectifier arrangement with an alternating current measuring bridge, for instance, the relay may serve to control a device for automatically balancing the measuring bridge. Such a balance takes place, as a rule, by changing one or more measuring values connected in the bridge. It is, of course, also possible to vary the alternating current resistance by the control winding of the relay in such a manner that the measuring bridge is balanced. This is of advantage particularly in cases where the measuring object should receive a definite alternating current resistance and may also be effected by an indirect control of the measuring object. As example may be mentioned the task to maintain permanently a definite concentration of an acid in a solution. The relay may in this case be employed to regulate the supply of acid or water by means of suitable valves.

Figs. 5 and 6 of the drawing show further embodiments of the invention. The parts shown should be imagined to be inserted in Fig. 1.

According to Fig. 5 the arm $R_x$ of the alternating current bridge is designed as resistance thermometer and fitted in a tank for heat treatment purposes. The voltage, which is indicated by the galvanometer in Fig. 1, may, for example, be joined via terminal connections I and II (see Fig. 5) to a relay device $r$ which includes a polarized relay. By the relay arrangement $r$ a heating circuit is controlled, for instance, by passing current through the heating resistance $R_h$ of the tank $b$.

According to Fig. 6 the arm $R_x$ of the alternating current bridge is formed by an electrolytic bath $e$. The voltage, which is indicated by the galvanometer in Fig. 1, may, for instance, be joined to terminal connections I and II (see Fig. 6) to a relay device $r$ which includes polarized relay and which operates an electro-magnet $m$ in such a way that a valve in the trickling vessel $d$ is controlled and the concentration of the solution of the electrolytic bath $e$ is kept constant. By adjusting a definite phase position between auxiliary voltage and feed voltage only the influence of the ohmic resistance of the bath affects the regulation but not the capacity between the electrodes of the bath.

For carrying out bridge measurements it is not absolutely necessary that the bridge be balanced by hand or automatically. Since for small unbalances the voltage to be measured is a linear function of the unbalance, it is possible to measure the unbalance of the measuring bridge in regard to magnitude and phase directly by the deflection of the pointer instrument of the rectifier arrangement or by the records of a registering instrument.

I claim as my invention:

1. In a rectifier arrangement for the purpose of alternating current measurement, control, and the like, a rectifier bridge, rectifiers in at least two branches of such bridge, the circuits of said rectifiers having substantially straight-line characteristics, coupling devices for supplying to said bridge the voltage to be measured and an auxiliary voltage which is high relatively to said first-mentioned voltage, said coupling devices being so arranged that the vectorial sum as well as the vectorial difference of said two voltages will have the same direction, whereby the difference between the rectified currents will, within wide limits and irrespective of the amplitude of said auxiliary voltage, afford a measure for the magnitude and for the direction of the voltage to be measured, and a direct-current indicating instrument located in the diagonal branch of said rectifier bridge, to indicate the voltage being measured.

2. In a rectifier arrangement for the purpose of alternating current measurement, control, and the like, a rectifier bridge, rectifiers in at least two branches of such bridge, the circuits of said rectifiers having substantially straight-line characteristics, an alternating current bridge associated with said rectifier bridge, a source of electricity for supplying alternating current to said alternating current bridge, coupling devices associated with said rectifier bridge to supply to the rectifier circuits, as the voltage to be measured, the output voltage of said alternating current bridge, and, as an auxiliary voltage, the voltage of said source of alternating current, said auxiliary voltage being high relatively to the voltage to be measured, said coupling devices being so arranged that the vectorial sum as well as the vectorial difference of said two voltages will have the same direction, whereby the difference between the rectified currents will, within wide limits and irrespective of the amplitude of said auxiliary voltage, afford a measure for the magnitude and for the direction of the voltage to be measured, and a direct-current indicating instrument located in the diagonal branch of said rectifier bridge, to indicate the voltage being measured.

3. In a rectifier arrangement for the purpose of alternating current measurement, control, and the like, a rectifier bridge, rectifiers in at least two branches of such bridge, the circuits of said rectifiers having substantially straight-line characteristics, an alternating current bridge associated with said rectifier bridge, a source of electricity for supplying alternating current to said alternating current bridge, coupling devices associated with said rectifier bridge to supply to the rectifier circuits, as the voltage to be measured, the output voltage of said alternating current bridge, and, as an auxiliary voltage, the voltage of said source of alternating current, a phase changer between the source of alternating current and the coupling device which supplies the auxiliary voltage to the rectifier bridge, for changing the phase angle between the voltage to be measured and the auxiliary voltage, the latter being high relatively to the voltage to be measured, said coupling devices being so arranged that the vectorial sum as well as the vectorial difference of said two voltages will have the same direction, whereby the difference between the rectified currents will, within wide limits and irrespective of the amplitude of said auxiliary voltage, afford a measure for the magnitude and for the direction of the voltage to be measured, and a direct-current indicating instrument located in the diagonal branch of said rectifier bridge, to indicate the voltage being measured.

4. In a rectifier arrangement for the purpose of alternating current measurement, control, and the like, a rectifier bridge, rectifiers in at least two branches of such bridge, the circuits of said rectifiers having substantially straight-line characteristics, an alternating current bridge associated with said rectifier bridge, a source of electricity for supplying alternating current to said alternating current bridge, coupling devices associated with said rectifier bridge to supply to the rectifier circuits, as the voltage to be measured, the output voltage of said alternating current bridge, and, as an auxiliary voltage, the voltage of said source of alternating current, a phase changer between the source of alternating current and the coupling device which supplies the auxiliary voltage to the rectifier bridge, for producing a phase angle of 90° between the voltage to be measured and said auxiliary voltage, the latter being high relatively to the voltage to be measured, said coupling devices being so arranged that the vectorial sum as well as the vectorial difference of said two voltages will have the same direction, whereby the difference between the rectified currents will, within wide limits and irrespective of the amplitude of said auxiliary voltage, afford a measure for the magnitude and for the direction of the voltage to be measured, and a direct-current indicating instrument located in the diagonal branch of said rectifier bridge, to indicate the voltage being measured.

5. In a rectifier arrangement for the purpose of alternating current measurement, control, and the like, a rectifier bridge, rectifiers in at least two branches of such bridge, the circuits of said rectifiers having substantially straight-line characteristics, an alternating current bridge associated with said rectifier bridge, a source of electricity for supplying alternating current to said alternating current bridge, coupling devices associated with said rectifier bridge to supply to the rectifier circuits, as the voltage to be measured, the output voltage of said alternating current bridge, and, as an auxiliary voltage, the voltage of said source of alternating current, said auxiliary voltage being high relatively to the voltage to be measured, said coupling devices being so arranged that the vectorial sum as well as the vectorial difference of said two voltages will have the same direction, whereby the difference between the rectified currents will, within wide limits and irrespective of the amplitude of said auxiliary voltage, afford a measure for the magnitude and for the direction of the voltage to be measured, a resistance connected in said rectifier bridge, a variable resistance in said alternating current bridge, and a transformer connection between the portion of the rectifier bridge including said first mentioned resistance and the portion of the alternating current bridge including said variable resistance.

HANS WALTER.